(12) United States Patent
Weinfield

(10) Patent No.: US 9,936,361 B1
(45) Date of Patent: Apr. 3, 2018

(54) FILTERING INCOMING MESSAGES OF A DEDICATED SHORT RANGE COMMUNICATION SYSTEM

(71) Applicants: DENSO International America, Inc., Southfield, MI (US); DENSO CORPORATION, Kariya-shi, Aichi-Ken (JP)

(72) Inventor: Aaron D. Weinfield, Encinitas, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/371,489

(22) Filed: Dec. 7, 2016

(51) Int. Cl.
  *H04B 7/00* (2006.01)
  *H04W 4/12* (2009.01)
  *H04W 4/00* (2018.01)
  *H04B 17/318* (2015.01)

(52) U.S. Cl.
  CPC ............ *H04W 4/12* (2013.01); *H04B 17/318* (2015.01); *H04W 4/008* (2013.01)

(58) Field of Classification Search
  CPC ..... H04W 48/16; H04W 12/06; H04W 24/10; H04W 4/008; H04W 4/023; H04W 4/046; H04W 84/12; H04W 12/04; H04W 12/10; H04W 24/02; H04W 36/16; H04W 36/36; H04W 40/28; H04W 48/20; H04W 4/001; H04W 4/02; H04W 4/08; H04L 1/0002; H04L 1/0003; H04L 1/0007; H04L 1/0009; H04L 1/20; H04L 43/16; H04L 47/10; H04L 63/0492; H04L 63/126; H04L 65/4084; H04L 65/80; H04L 67/12; H04L 69/32
  See application file for complete search history.

(56) References Cited

U.S. PATENT DOCUMENTS

| 2011/0080302 | A1* | 4/2011 | Muthaiah | H04L 47/10 340/903 |
| 2013/0229930 | A1* | 9/2013 | Akay | H04W 52/0245 370/252 |
| 2014/0323087 | A1* | 10/2014 | Huang | H04W 48/16 455/411 |
| 2014/0358416 | A1 | 12/2014 | Ibrahim | |
| 2016/0260328 | A1* | 9/2016 | Mishra | G08G 1/163 |

\* cited by examiner

*Primary Examiner* — Golam Sorowar
(74) *Attorney, Agent, or Firm* — Harness, Dickey & Pierce, P.L.C.

(57) ABSTRACT

Systems and methods for filtering received messages of a dedicated short range communications (DSRC) system are provided. A receiver module receives messages from at least one of a remote vehicle and an infrastructure system. A processing module determines at least one of a central processing unit (CPU) usage and a messages received frequency (MRF) of the DSRC system, determines a received signal strength (RSS) of a received message, determines whether the RSS of the received message is greater than a RSS threshold, and processes the received message in response to the RSS of the received message being greater than the RSS threshold. An RF filter control module adjusts an RSS threshold in response to at least one of the CPU usage being greater than a threshold CPU usage, the MRF being greater than a maximum threshold MRF, and the MRF being less than a minimum threshold MRF.

14 Claims, 7 Drawing Sheets

FILTERING INCOMING MESSAGES OF A DEDICATED SHORT RANGE COMMUNICATION SYSTEM

FIELD

The present disclosure relates to filtering incoming messages of a dedicated short range communication (DSRC) system and, in particular, to filtering incoming messages of a DSRC system based on received signal strength of the incoming messages.

BACKGROUND

This section provides background information related to the present disclosure which is not necessarily prior art.

Vehicle-to-vehicle and vehicle-to-infrastructure (collectively referred to as V2X) safety technology relies on a host vehicle receiving messages via a DSRC system from at least one remote vehicle. However, each channel of DSRC radio communication may be limited in its capacity to receive incoming messages. As an example, the DSRC radio channel may be configured to receive up to 2,500 messages per second. As such, when a large number of remote vehicles equipped with V2X safety technology are located and transmitting messages within a close range of the host vehicle, the number of messages that need to be processed by the host vehicle may exceed the DSRC radio channel capacity.

Additionally, the host vehicle on-board equipment (OBE) central processing unit (CPU) may further limit the amount of received messages that can be processed. As an example, if the DSRC radio channel is configured to receive up to 2,500 messages per second, and the CPU of the DSRC system is configured to receive/process up to 1,000 messages per second, the CPU may limit the processing speed of the DSRC system to 1,000 messages per second. As such, there is a need to address the issue of the DSRC radio channel receiving messages at a frequency above the DSRC radio channel capacity and/or the processing speed of the CPU of the DSRC system.

SUMMARY

This section provides a general summary of the disclosure, and is not a comprehensive disclosure of its full scope or all of its features.

A method of filtering received messages using a dedicated short range communications (DSRC) system is provided and includes determining, using a processor that is configured to execute instructions stored on a non-transitory memory component, at least one of a central processing unit (CPU) usage and a messages received frequency (MRF) of the DSRC system. The method also includes adjusting, using the processor, an RSS threshold of the DSRC system in response to at least one of the CPU usage being greater than a threshold CPU usage, the MRF being greater than a maximum threshold MRF, and the MRF being less than a minimum threshold MRF. The method also includes receiving a message from at least one of a remote vehicle and an infrastructure system. The method also includes determining, using the processor, a received signal strength (RSS) of the message. The method also includes determining, using the processor, whether the RSS of the message is greater than the RSS threshold. The method also includes processing, using the processor, the message in response to the RSS of the message being greater than the RSS threshold.

An apparatus for filtering received messages of a dedicated short range communications (DSRC) system is also provided and includes a receiver module that is configured to receive messages from at least one of a remote vehicle and an infrastructure system. The system also includes a processing module that is configured to, based on executable instructions stored on a non-transitory memory component, determine at least one of a central processing unit (CPU) usage and a messages received frequency (MRF) of the DSRC system, determine a received signal strength (RSS) of a received message, determine whether the RSS of the received message is greater than a RSS threshold, and process the received message in response to the RSS of the received message being greater than the RSS threshold. The system also includes an RF filter control module that is configured to, using the processing module, adjust an RSS threshold of the DSRC system in response to at least one of the CPU usage being greater than a CPU threshold, the MRF being greater than a maximum threshold MRF, and the MRF being less than a minimum threshold MRF.

Another apparatus for filtering received messages of a dedicated short range communications (DSRC) system is provided and includes a receiver module that is configured to receive messages from at least one of a remote vehicle and an infrastructure system, a first processing module that is configured to, based on executable instructions stored on a non-transitory memory component, determine at least one of a central processing unit (CPU) usage and a messages received frequency (MRF) of the DSRC system, determine a received signal strength (RSS) of a received message, determine whether the RSS of the received message is greater than a RSS threshold, and process the received message in response to the RSS of the received message being greater than the RSS threshold. The apparatus also includes an RF filter control module that is implemented by a second processing module that is configured to execute instructions stored on a non-transitory memory component, wherein the RF filter control module configured to adjust an RSS threshold of the DSRC system in response to at least one of the CPU usage being greater than a CPU threshold, the MRF being greater than a maximum threshold MRF, and the MRF being less than a minimum threshold MRF.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
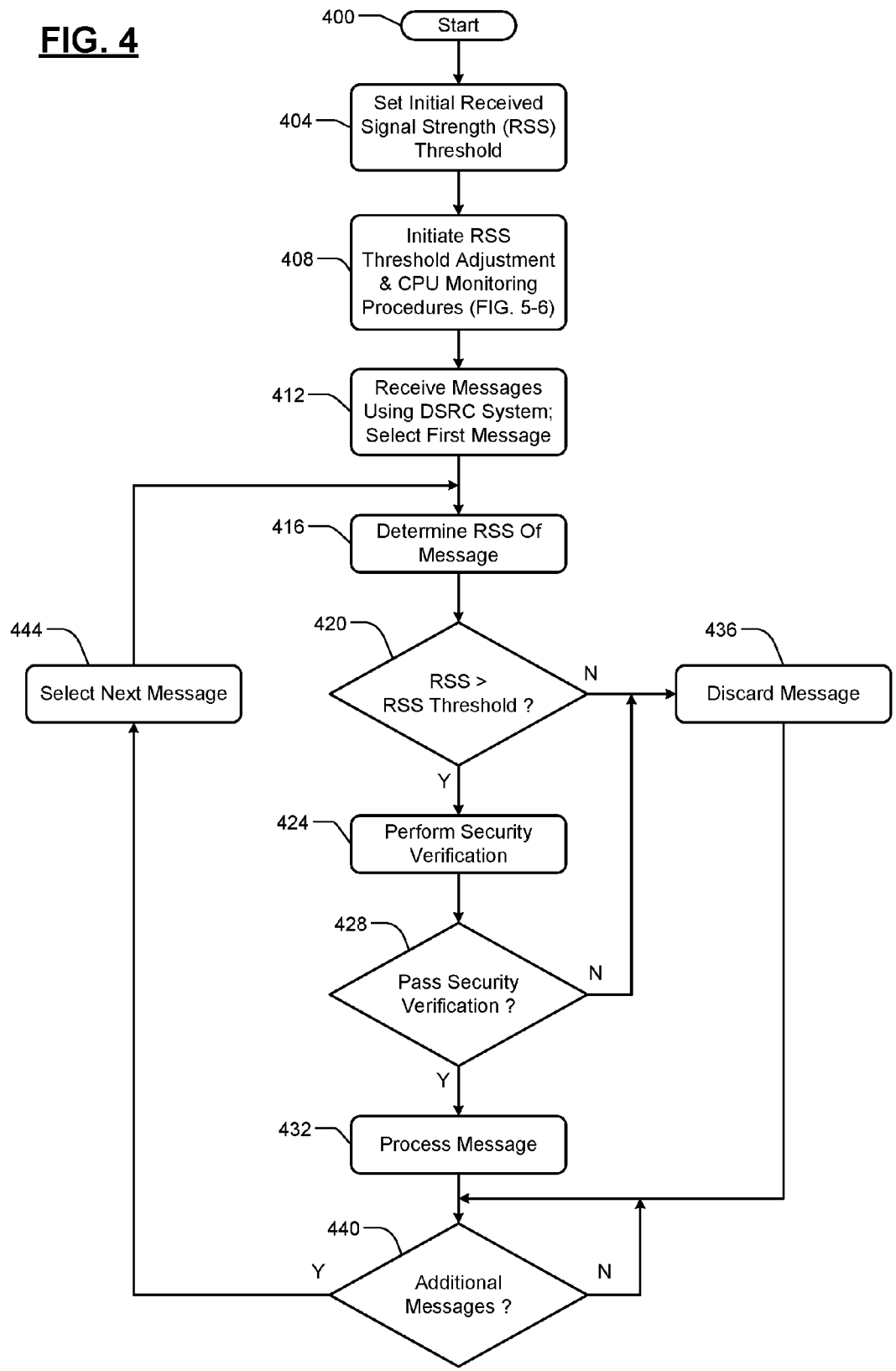
Figure 5:
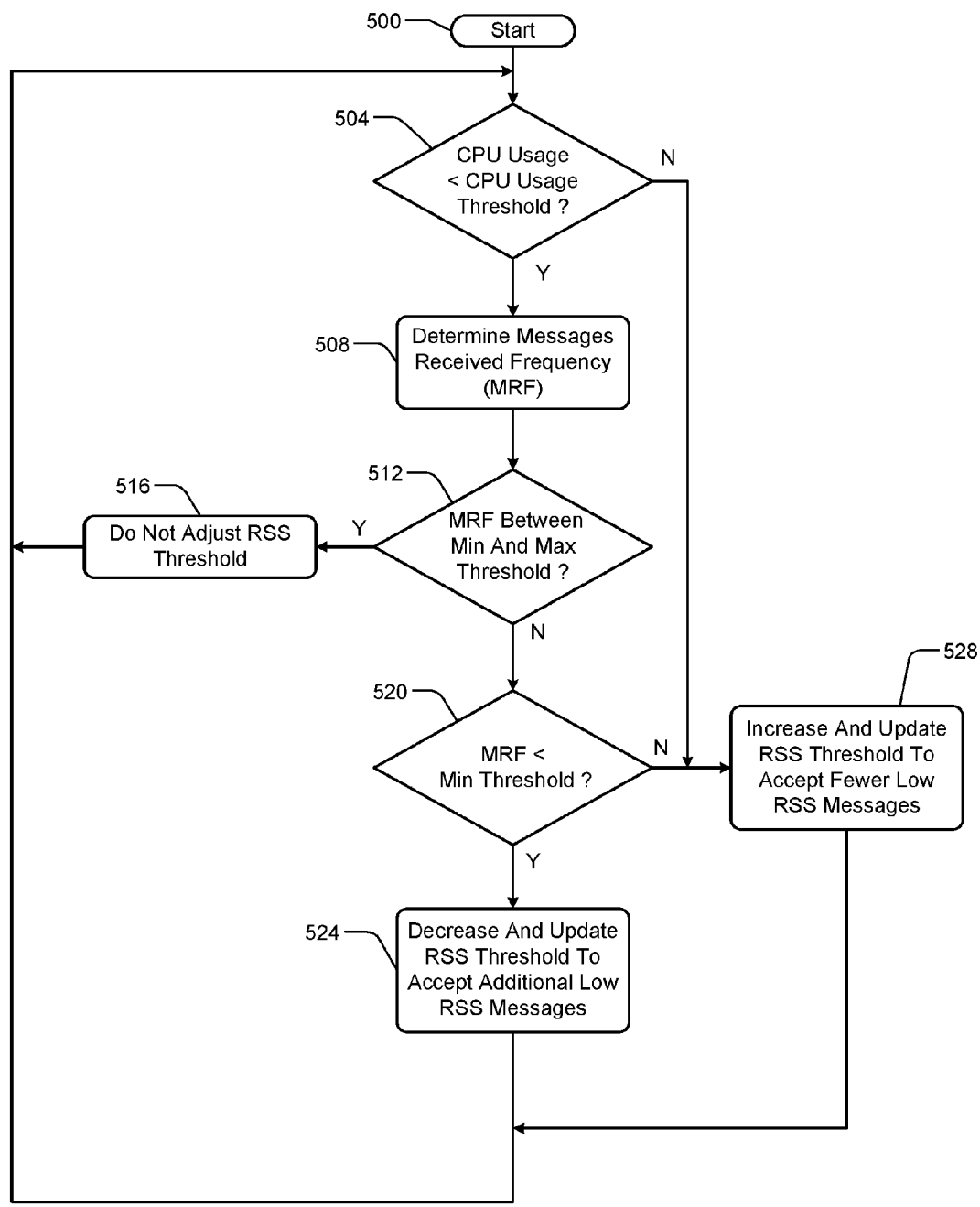
Figure 6:
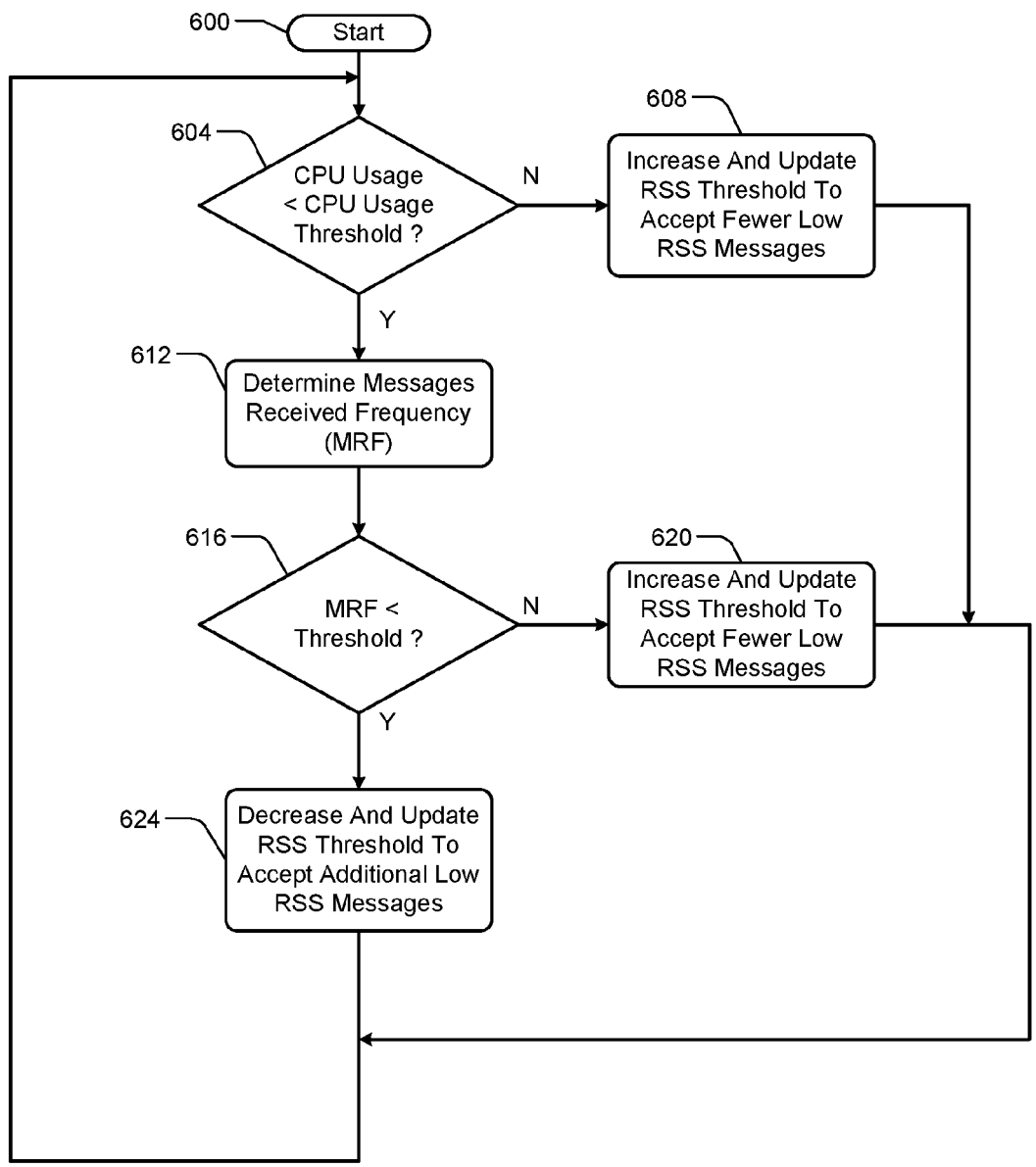

FIG. 4 is a flowchart showing an example implementation of a method for filtering out remote vehicle messages when a received message frequency of a DSRC radio channel exceeds a threshold value, according to the present teachings FIG. 5 is a flowchart showing an example implementation of a method for dynamically updating a received signal strength (RSS) threshold of a DSRC system, according to the present teachings; and FIG. 6 is a flowchart showing an example implementation of a method for dynamically updating an RSS threshold based on a threshold messages received frequency (MRF), according to the present teachings.

Corresponding reference numerals indicate corresponding parts throughout the several views of the drawings.

DETAILED DESCRIPTION

Example embodiments will now be described more fully with reference to the accompanying drawings.

Figure 1A:
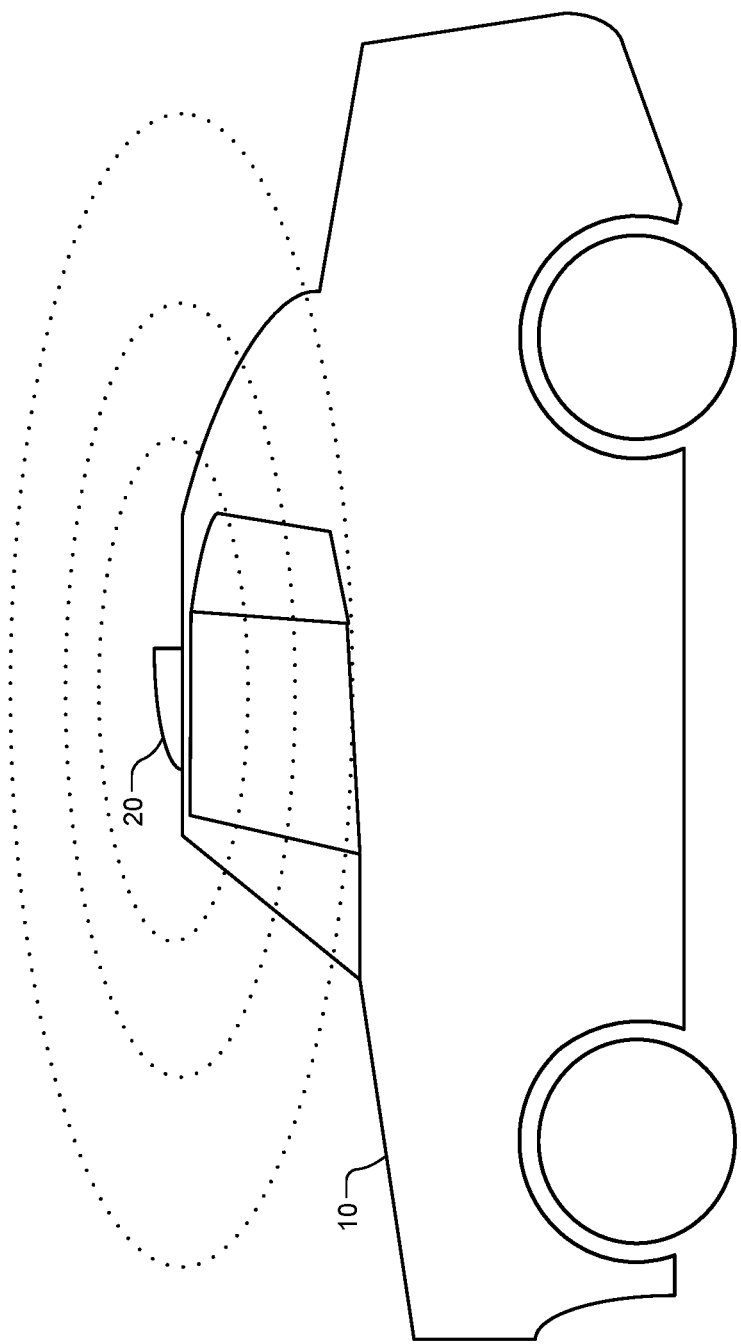
FIGS. 1A-1B are high-level illustrations of vehicles equipped with V2X safety technology according to the present teachings.

With reference to FIG. 1A, a vehicle with V2X safety technology is shown. In the example embodiment, a vehicle 10 is equipped with a DSRC system 20. The DSRC system 20 may be configured to transmit and receive signals representing, for example, early warnings of accidents and driving hazards to/from remote vehicles that are also equipped with V2X systems and/or to/from an infrastructure communication location equipped with a V2X system. Additionally, the DSRC system 20 may be configured to predict future accidents and driving hazards based on communication with remote vehicles and/or infrastructure communication locations that are also equipped with V2X systems by calculating the current and future positions of the vehicle 10.

The DSRC system 20 may also be configured to improve a fuel efficiency of the vehicle 10. The DSRC system 20 may be configured to communicate to an operator of the vehicle 10 a timing of a traffic signal, thereby allowing the operator to optimize fuel efficiency and perform time-saving driving habits. As an example, the DSRC system 20 may be configured to communicate with the traffic signal and alert the operator as to how much time he or she has until the light will change from a red light to a green light, a green light to a yellow light, or a yellow light to a red light. As another example, the DSRC system 20 may instruct the operator to operate the vehicle at a certain speed in order to avoid being stopped by a red light on a traffic route.

The DSRC system 20 may communicate with other vehicles or infrastructure equipped with a V2X system by using a 75 MHz band around a 5.9 GHz signal. An example embodiment of the DSRC system 20 is described in further detail below with reference to FIG. 2. All of the components of the DSRC system 20 may be located at one or multiple locations on the roof of the vehicle. Alternatively, some of the components may be located in the interior of the vehicle 10.

Figure 1B:
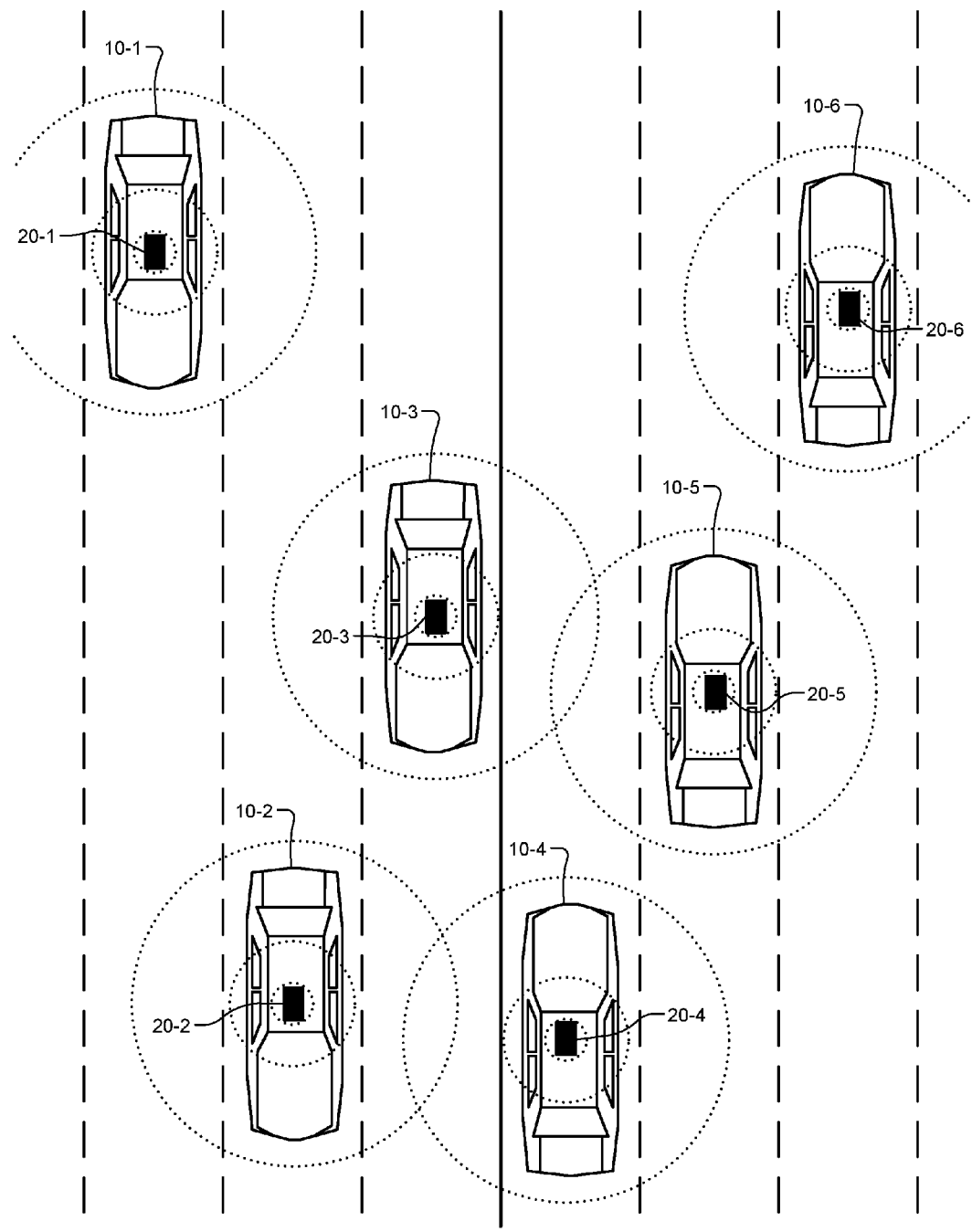

With reference to FIG. 1B, a plurality of vehicles with V2X safety technology is shown. In the example embodiment, vehicles 10-1, 10-2, . . . 10-6 (collectively referred to as vehicles 10) are respectively equipped with DSRC systems 20-1, 20-2, . . . 20-6 (collectively referred to as DSRC systems 20). The DSRC systems 20 may operate in both line-of-sight (LOS) and non-line-of-sight (NLOS) conditions, thereby allowing the DSRC systems 20 of the vehicles 10 to communicate warnings and driving hazards, even with blockage from intervening vehicles, blind corners, or other roadside infrastructure. DSRC signals from each of the DSRC systems 20 are illustrated radiating outward in a circular pattern, as indicated by dotted circles in FIG. 1B.

In some situations, the DSRC signal coverage around the vehicle 10 may be non-circular. Thus, the effective link range between the vehicles 10 may be reduced in certain directions and may ultimately impair the delivery of alerts and warnings. For example, the link range may be degraded or reduced based on the shape of a vehicle body and blockage from the curved roof; the use of metals, nonmetals, and/or glass on the vehicle body; roof blockage, including racks, bags, luggage carriers, etc.; the sizes, locations, and number of antennas; interference from other wireless antenna elements, such as LTE/cellular interference; and weaker coverage below the vehicle's horizon. However, these factors may be mitigated by the implementation of a dual-chain transmit (Tx) and diversity receive (Rx) mode; antenna elements positioned on the glass, headliner, plastic, and/or other surface of the vehicle in addition to antenna elements located on the roof; additional amplifiers in a Tx/Rx signal path; and low-loss radio frequency (RF) cable assemblies that connect antennas to optional amplifiers or to the DSRC radio.

Figure 2:
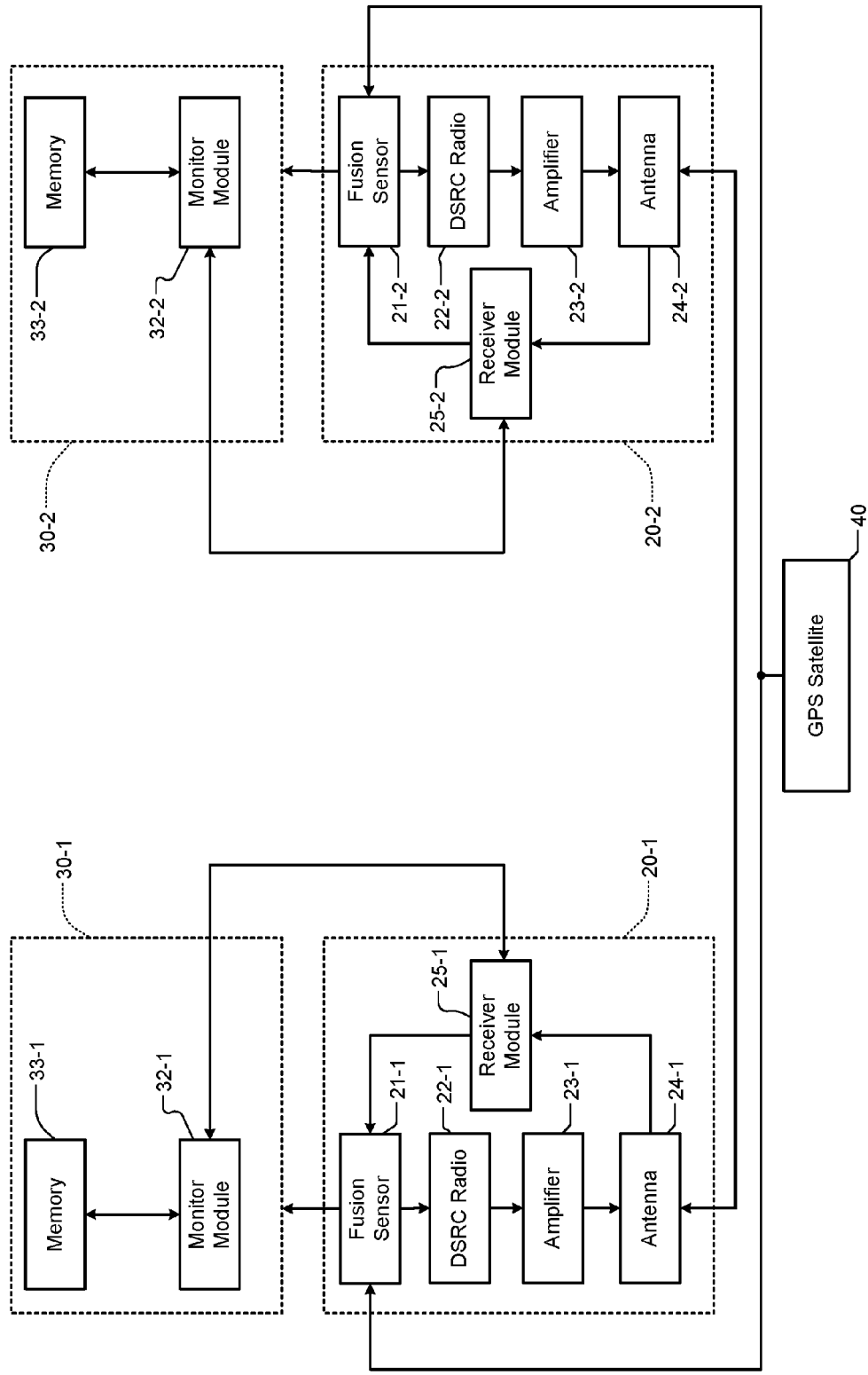
FIG. 2 is a block diagram of an apparatus for filtering out remote vehicle messages when a received message frequency of a DSRC radio channel exceeds a threshold value, according to the present teachings.

With reference to FIG. 2, a high-level block diagram of a system including a message control system and a DSRC system is shown. The system includes the DSRC systems 20-1, 20-2 (collectively referred to as DSRC systems 20), which may each further include fusion sensors 21-1, 21-2 (collectively referred to as fusion sensors 21), DSRC radios 22-1, 22-2 (collectively referred to as DSRC radios 22), amplifiers 23-1, 23-2 (collectively referred to as amplifiers 23), antennas 24-1, 24-2 (collectively referred to as antennas 24), and receiver modules 25-1, 25-2 (collectively referred to as receiver modules 25). The system may also include message control systems 30-1, 30-2 (collectively referred to as message control systems 30), which may each further include monitor modules 32-1, 32-2 (collectively referred to as monitor modules 32), and memories 33-1, 33-2 (collectively referred to as memories 33).

The fusion sensor 21, which may further include a GPS receiver, may receive geospatial location data that includes positioning and time information from a GPS satellite 40. The DSRC radio 22 transmits DSRC radio signals representing the geospatial location data from the fusion sensor 21 through the antenna 24. Additionally or alternatively, the DSRC system 20 may communicate positioning and time information from the GPS satellite 40 via an LTE or other cellular data signal. The amplifier 23, which may be a bidirectional amplifier, may electrically couple the DSRC radio 22 and the antenna 24 via an RF cable. The amplifier 23 may increase the range of the DSRC radio signal generated by the DSRC radio 22 and increase the lower boundary of signal strength detectable by the antenna 24.

In addition to receiving geospatial location data from the satellite 40 and transmitting DSRC radio signals through the antenna 24 corresponding to the geospatial location data, the DSRC system 20 may be configured to receive signals transmitted from remote vehicles and/or infrastructure systems. Accordingly, the receiver module 25 may be configured to receive DSRC radio signals through the antenna 24. An example embodiment of the receiver module 25 is described in further detail below with reference to FIG. 3.

The message control system 30, using the monitor module 32, is configured to detect a messages received frequency (MRF) of the DSRC system 20 and to adjust an RF filter of the receiver module 25. The MRF may be defined as the number of messages the DSRC system 20 receives per unit of time. The monitor module 32 may be implemented with a processor that is configured to, based on instructions stored in the memory 33 and in response to receiving demodulated DSRC radio signals from the receiver module 25, determine the MRF of the DSRC system 20 and to provide a signal to the receiver module 25 based on the MRF. Additionally, the monitor module 32, which may be implemented by the processor, may be configured to, based on memory stored in a non-transitory computer readable medium, determine a CPU usage of the messaging control system 30 and/or the DSRC system 20. The memory 33 may be a non-transitory computer readable medium, such as a read-only memory (ROM) and/or random-access memory (RAM) component.

Alternatively, the monitor module 32 may not be implemented by a processor and may be a separate module located within the message control system 30. As an example, the monitor module 32 may be implemented by a second processor of the message control system 30 that is in communication with the memory 33 and a first processor.

Figure 3:
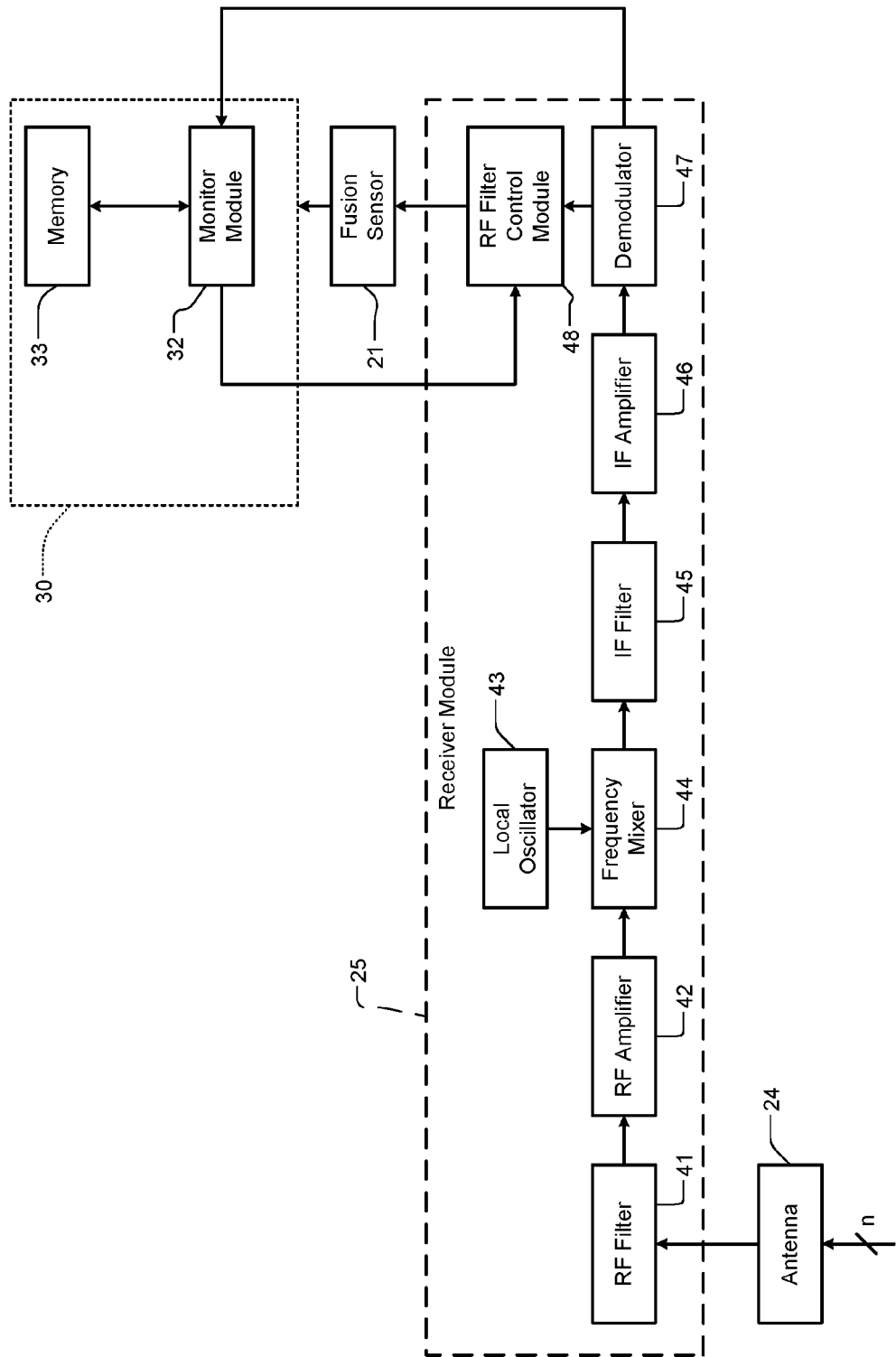
FIG. 3 is a block diagram of an example embodiment of the receiver module of the apparatus for filtering out remote vehicle messages when a received message frequency of a DSRC radio channel exceeds a threshold value, according to the present teachings.

With reference to FIG. 3, a detailed illustration of the message control system 30 and the receiver module 25 is shown. In an example embodiment, the receiver module 25 receives messages from the antenna 24, and the receiver module 25 may include an RF filter 41 and an RF amplifier 42 to suppress image frequencies and to prevent the system from becoming saturated. A local oscillator 43 of the receiver module may be configured to provide a mixing frequency to a frequency mixer 44 in order to change the received frequency into a new, intermediate frequency. An intermediate frequency (IF) filter 45 and an IF amplifier 46 may be configured to amplify the signal and limit the intermediate frequencies to a certain bandwidth. Subsequently, a demodulator 47 may extract the desired modulation from the filtered intermediate frequency and deliver the extracted modulation, which includes the message from the remote vehicle, to the message control system 30.

As stated above, the monitor module 32 is configured to detect the MRF of the DSRC system 20. As an example, the monitor module 32 may be coupled with the demodulator 47. Accordingly, the monitor module 32 may be configured to, based on instructions stored in the memory 33, determine the MRF of the DSRC system 20 by determining how many demodulated messages per second the demodulator 47 is extracting from the DSRC radio signals (e.g., MRF=1,500 messages per second).

Based on the MRF of the DSRC system 20, the monitor module 32 may then be configured to adjust an RF filter control module 48 of the receiver module 25. The RF filter control module 48 is configured to limit the amount of messages that are delivered, thereby ensuring that the message control system 30 is capable of efficiently processing critically important messages. As an example, if the monitor module 32 determines that the MRF of the DSRC system 20 is above a maximum threshold MRF, the monitor module 32 may instruct the RF filter control module 48 to filter out more incoming messages. Furthermore, if the monitor module 32 determines that the MRF of the DSRC system 20 is below a minimum threshold MRF, the monitor module 32 may instruct the RF filter control module 48 to disable filtering and to allow all incoming messages to be delivered to the message control system 30 through the fusion sensor 21.

As an example, to filter out messages based on the MRF of the DSRC system 20, the RF filter control module 48 may be configured to filter out messages based on the RSS of the message. To measure the RSS of a message, the filter control module 48 may be configured to determine at least one of a power ratio in decibels of the message (dBm), a power spectral density of the message (dBm/MHz), and/or a bit error rate (BER) of the message.

Using the RSS of the message may allow the message control system 30 to determine the relative proximity of the remote vehicle in relation to the host vehicle. Generally, a higher RSS may indicate that the remote vehicle is closer to the host vehicle, while a lower RSS may indicate that the remote vehicle is further away from the host vehicle. Messages transmitted from remote vehicles that have a high RSS (i.e., the remote vehicle is relatively close to the host vehicle) may be processed first in order to optimize the safety of the host vehicle based in part on the notion that remote vehicles closest to the host vehicle pose the greatest danger to the operator. Messages transmitted from remote vehicles that have a lower RSS (i.e., the remote vehicle is relatively far from the host vehicle) are filtered out due to their relatively low threat to the host vehicle. Thus, by filtering out messages that have a low RSS, the MRF of the DSRC system 20 may be at a value that is suitable for efficiently processing incoming messages.

The RF filter control module 48 may be configured to filter out messages when the RSS of the message is below a RSS threshold. The RSS threshold may initially be a value that corresponds to a signal strength of a message at a certain threshold distance from the vehicle (e.g., 300 meters). As such, the initial RSS threshold may be predetermined based on empirical data obtained from an operator. Additionally or alternatively, the RSS threshold may be a dynamic value that is configured to constantly update based on traffic, road conditions, and/or the MRF, as discussed in further detail below.

The RF filter control module 48 may be configured to, based on instructions stored in memory and in response to receiving demodulated DSRC radio signals from the receiver module 25, adjust the RSS threshold of the RF filter control module 48 based on a signal from the monitor module 32. Accordingly, the RF filter control module 48 may be in communication with the monitor module 32 via, for example, a hard-wire or telemetric link. The memory of the RF filter control module 48 may be a non-transitory computer readable medium, such as a ROM or RAM component. The RF filter control module 48 may be implemented by a processor configured to, based on instructions stored in the memory 33 and in response to receiving demodulated DSRC radio signals from the receiver module 25, adjust the RSS threshold of the RF filter control module 48 based on a signal from the monitor module 32. In some implementations, the monitor module 32 and the RF Filter control module 48 can be implemented with the same processor. Alternatively, the monitor module 32 and the RF Filter control module 48 can be implemented with different processors.

The RF filter control module 48 may be configured to, based on instructions stored in the memory and using the processor, adjust the RSS threshold of the RF filter control module 48 based on the CPU usage of the message control system 30 and/or the DSRC system 20 exceeding a threshold CPU usage. As an example, if the CPU usage is above the threshold CPU usage, the processor may not be able to efficiently process all received messages and have enough processing power to act on important messages. Accordingly, the RF filter control 48, in response to a determination from the processor that the CPU usage exceeds a threshold CPU usage may increase the RSS threshold of the RF filter control module 48, thereby decreasing the amount of messages received by the DSRC system 20 and allowing the processor to act on important messages.

The RF filter control module 48 may be configured to, in response to be activated by turning on the vehicle, initially disable all filtering and therefore accept all incoming messages. Filtering may be deactivated until, for example, the MRF of the DSRC system 20 exceeds a threshold value and/or the CPU usage of the message control system 30 exceeds the threshold CPU usage, as described below with reference to FIGS. 5-6. With reference to FIG. 4, an algorithm showing an example implementation of a method for filtering out remote vehicle messages is shown. The algorithm may be performed, for example, by the DSRC system 20 and the message control system 30 when the vehicle is turned on and starts at 400. Furthermore, the algorithm may be configured to continuously operate until the vehicle and the DSRC system 20 are turned off.

At 404, the algorithm sets an initial RSS threshold value for the DSRC system 20. As an example, the initial RSS threshold value may be determined during a calibration of the DSRC system 20, based on empirical data obtained from an operator, and stored in the memory 33. At 408, the algorithm initiates an RSS threshold adjustment procedure and a CPU monitoring procedure, which are configured to, as described below in further detail with reference to FIGS. 5-6, update an RSS threshold based on the MRF of the DSRC system 20 and/or the CPU usage of the DSRC system 20 and the message control system 30, if necessary.

At 412, the DSRC system begins to receive messages from, for example, one or more remote vehicles equipped with a V2X system and/or an infrastructure communication location equipped with a V2X system. Additionally, the DSRC system selects a first, or a next, message from a plurality of messages received by the DSRC system.

The algorithm from 412 then proceeds to 416. At 416, the algorithm determines an RSS of the selected message. At 420, the algorithm determines whether the RSS of the selected message is greater than the current RSS threshold. The RSS threshold may be the initial RSS threshold or, as described below in further detail in FIG. 5, the RSS threshold may be updated based on the MRF of the DSRC system. If the RSS is greater than the RSS threshold, then the algorithm proceeds to 424; otherwise, the algorithm discards the message at 436.

At 424, the algorithm performs a security verification on the selected message. Security verification may include authenticating that the selected message originated from a properly certified remote vehicle and/or infrastructure system and that it was not manipulated on its way between the remote and host vehicle. Thus, the security verification may prevent denial of service (DOS), distributed denial of service (DDOS), Sybil, and/or node impersonation attacks of a network in which V2X communications occur. Furthermore, cryptographic security verification may prevent application/forged message, timing, social, monitoring, and replay attacks on the V2X system. The algorithm may be configured to employ a variety of cryptographic verification techniques for certifying incoming messages, such as a verify-on-demand (VOD) and/or a verify-then-process (VTP) verification on the selected message. For example, algorithms for performing security verification are described in detail in U.S. patent application Ser. No. 15/284,573, filed Oct. 4, 2016, assigned to DENSO International America, Inc., which is incorporated herein by reference in its entirety.

At 428, the algorithm determines whether the selected message passes verification. If so, the algorithm proceeds to 432; otherwise, in response to the message being, for example, corrupted or subject to malicious tampering, the message is discarded at 436.

At 432, the algorithm processes the selected message and then proceeds to 440. At 440, the algorithm determines whether there are additional messages that were received by the DSRC system. If so, the algorithm proceeds to 444 and the algorithm selects the next message that was received by the DSRC system. After selecting the next message, the algorithm returns to 416. If the algorithm determines there are not any additional messages that were received by the DSRC system at 444, the algorithm remains at 440 until additional messages are received by the DSRC system.

With reference to FIG. 5, an algorithm showing an example implementation of a method for dynamically updating an RSS threshold is shown. The algorithm in FIG. 5 may be performed simultaneously/concurrently with the algorithm described in FIG. 4. The algorithm may be performed, for example, by the DSRC system 20 and the message control system 30 when the algorithm sets the initial RSS threshold value for the DSRC system 20, as described above in further detail at step 408 in FIG. 4 and starts at 500. Furthermore, the algorithm may be configured to continuously update the RSS threshold, if necessary, until the vehicle and the DSRC system 20 are turned off.

At 504, the algorithm determines whether the CPU usage is less than the threshold CPU usage (e.g., 60%). If so, the algorithm proceeds to 508; otherwise, the algorithm proceeds to 528. At 508, the algorithm determines the current MRF of the DSRC system (e.g., MRF=1,700 messages per second). At 512, the algorithm determines whether the MRF is between a predetermined minimum threshold MRF and a predetermined maximum threshold MRF. The minimum threshold MRF and the maximum threshold MRF may be generally defined as the upper and lower MRF limits in which the DSRC system may operate without having to adjust the RSS threshold. The minimum threshold MRF and the maximum threshold MRF may be predetermined based on empirical data related to the processing capabilities of the DSRC system 20 obtained from an operator. As an example, the minimum threshold MRF may be 2,000 messages per second, and the maximum threshold MRF may be 2,100 messages per second. Alternatively, a single threshold MRF value may be used instead of the minimum threshold MRF and the maximum threshold MRF. An embodiment in which a single threshold MRF value is used is described below in further detail with reference to FIG. 6.

Accordingly, at 512, if the current MRF is between the minimum threshold MRF and the maximum threshold MRF, the algorithm proceeds to 516; otherwise, the algorithm proceeds to 520. At 516, the algorithm does not adjust the RSS threshold and returns to 504. At 520, the algorithm determines whether the MRF is less than the minimum threshold MRF. If so (e.g., MRF=1,400 messages per second), then the algorithm proceeds to 524; otherwise, the algorithm proceeds to 528. At 524, the algorithm, using the monitor module 32 and the RF filter control module 48, decreases and updates the RSS threshold to accept additional low RSS messages.

As an example, at 524, the monitor module 32 may adjust the RSS threshold of the RF filter control module 48 to disable all filtering and therefore accept all incoming messages. Furthermore, if the monitor module 32 adjusts the RSS threshold of the RF filter control module 48 to disable all filtering, the monitor module 32 may be configured to set the RSS threshold at a minimum RSS threshold, which may correspond with the RSS threshold at which all filtering is disabled. As an example, if the minimum RSS threshold that corresponds with disabled filtering is −95 dBm, then the monitor module 32 may not decrease the RSS threshold below this value. Alternatively, the RSS threshold of the RF filter control module 48 may be lowered to filter out less incoming messages, thereby increasing the MRF of the DSRC system. The algorithm then returns to 504.

At 528, the algorithm, using the monitor module 32 and the RF filter control module 48, increases and updates the RSS threshold (e.g., increases RSS threshold from −91 dBm to −90 dBm) to accept less low RSS messages, thereby decreasing the MRF of the DSRC system. Then, the algorithm returns to 504.

With reference to FIG. 6, an algorithm showing an example implementation of a method for dynamically updating an RSS threshold based on a single threshold MRF is shown. The algorithm in FIG. 6 may be performed simultaneously/concurrently with the algorithm described in FIG. 4. The algorithm may be performed, for example, by the DSRC system 20 and the message control system 30 when the algorithm sets the initial RSS threshold value for the DSRC system 20, as described above in further detail at step 408 in FIG. 4 and starts at 600. Furthermore, the algorithm may be configured to continuously update the RSS threshold, if necessary, until the vehicle and the DSRC system 20 are turned off.

At 604, the algorithm determines whether the CPU usage is less than the threshold CPU usage (e.g., 60%). If so, the algorithm proceeds to 612; otherwise, the algorithm proceeds to 608. At 608, the algorithm, using the monitor module 32 and the RF filter control module 48, increases and updates the RSS threshold (e.g., increases RSS threshold from −91 dBm to −90 dBm) to accept less low RSS messages, thereby decreasing the MRF of the DSRC system. Then, the algorithm returns to 604.

At 612, the algorithm determines the current MRF of the DSRC system (e.g., MRF=1,700 messages per second). At 616, the algorithm determines whether the MRF is less than a threshold MRF. The threshold MRF is the upper limit in which the DSRC system may operate without having to adjust the RSS threshold. In other words, the processor compares the MRF to a single threshold value. As an example, the threshold MRF may be 2,000 messages per second. If the current MRF is less than the MRF threshold, the algorithm proceeds to 624; otherwise, the algorithm proceeds to 620. At 620, the algorithm increases and updates the RSS threshold to accept fewer low RSS messages and returns to 604.

At 624, the algorithm decreases and updates the RSS threshold to accept additional low RSS messages. As an example, the monitor module 32 may adjust the RSS threshold of the RF filter control module 48 to disable all filtering and therefore accept all incoming messages. Furthermore, if the monitor module 32 adjusts the RSS threshold of the RF filter control module 48 to disable all filtering, the monitor module 32 may be configured to set the RSS threshold at the minimum RSS threshold, which may correspond with the RSS threshold at which all filtering is disabled. As an example, if the minimum RSS threshold that corresponds with disabled filtering is −95 dBm, then the monitor module 32 may not decrease the RSS threshold below this value. Alternatively, the RSS threshold of the RF filter control module 48 may be lowered to filter out less incoming messages, thereby increasing the MRF of the DSRC system. The algorithm then returns to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of filtering received messages using a dedicated short range communications (DSRC) system comprising:
    determining, using a processor that is configured to execute instructions stored on a non-transitory memory component, at least one of a central processing unit (CPU) usage and a messages received frequency (MRF) of the DSRC system;
    adjusting, using the processor, an RSS threshold of the DSRC system in response to at least one of the CPU usage being greater than a threshold CPU usage, the MRF being greater than a maximum threshold MRF, and the MRF being less than a minimum threshold MRF;
    receiving a message from at least one of a remote vehicle and an infrastructure system;
    determining, using the processor, a received signal strength (RSS) of the message;
    determining, using the processor, whether the RSS of the message is greater than the RSS threshold; and
    processing, using the processor, the message in response to the RSS of the message being greater than the RSS threshold,
    wherein adjusting the RSS threshold of the DSRC system in response to the MRF being greater than the maximum threshold MRF includes increasing the RSS threshold, and
    wherein adjusting the RSS threshold of the DSRC system in response to the MRF being less than the minimum threshold MRF includes decreasing the RSS threshold.

2. The method of claim 1 further including maintaining the RSS threshold of the DSRC system in response to one of the MRF being greater than or equal to the minimum threshold MRF and the MRF being less than or equal to the maximum threshold MRF.

3. The method of claim 1 further including discarding the message in response to the RSS of the message being less than the RSS threshold.

4. The method of claim 1 further including performing a security verification on the message in response to the RSS of the message being greater than the RSS threshold.

5. The method of claim 4 further including discarding the message in response to the message not passing the security verification.

6. An apparatus for filtering received messages of a dedicated short range communications (DSRC) system comprising:
    a receiver module that is configured to receive messages from at least one of a remote vehicle and an infrastructure system;

a processing module that is configured to, based on executable instructions stored on a non-transitory memory component:
determine at least one of a central processing unit (CPU) usage and a messages received frequency (MRF) of the DSRC system;
determine a received signal strength (RSS) of a received message;
determine whether the RSS of the received message is greater than a RSS threshold; and
process the received message in response to the RSS of the received message being greater than the RSS threshold; and
an RF filter control module that is configured to, using the processing module, adjust an RSS threshold of the DSRC system in response to at least one of the CPU usage being greater than a threshold CPU usage, the MRF being greater than a maximum threshold MRF, and the MRF being less than a minimum threshold MRF,
wherein the RF filter control module is configured to, in response to the MRF being greater than the maximum threshold MRF, increase the RSS threshold, and
wherein the RF filter control module is configured to, in response to the MRF being less than the minimum threshold MRF, decrease the RSS threshold.

7. The apparatus of claim 6 wherein the RF filter control module is configured to, in response to one of the MRF being greater than or equal to the minimum threshold MRF and the MRF being less than or equal to the maximum threshold MRF, maintain the RSS threshold.

8. The apparatus of claim 6 wherein the processing module is configured to discard the received message in response to the RSS of the received message being less than the RSS threshold.

9. The apparatus of claim 6 wherein the processing module is configured to perform a security verification on the received message in response to the RSS of the received message being greater than the RSS threshold.

10. The apparatus of claim 9 wherein the processing module is configured to discard the received message in response to the received message not passing the security verification.

11. An apparatus for filtering received messages of a dedicated short range communications (DSRC) system comprising:

a receiver module that is configured to receive messages from at least one of a remote vehicle and an infrastructure system;
a first processing module that is configured to, based on executable instructions stored on a non-transitory memory component:
determine at least one of a central processing unit (CPU) usage and a messages received frequency (MRF) of the DSRC system;
determine a received signal strength (RSS) of a received message;
determine whether the RSS of the received message is greater than a RSS threshold; and
process the received message in response to the RSS of the received message being greater than the RSS threshold; and
an RF filter control module that is implemented by a second processing module that is configured to execute instructions stored on a non-transitory memory component, wherein the RF filter control module configured to adjust an RSS threshold of the DSRC system in response to one of the CPU usage being greater than a threshold CPU usage, the MRF being greater than a maximum threshold MRF and the MRF being less than a minimum threshold MRF,
wherein the RF filter control module is configured to, in response to the MRF being greater than the maximum threshold MRF, increase the RSS threshold, and
wherein the RF filter control module is configured to, in response to the MRF being less than the minimum threshold MRF, decrease the RSS threshold.

12. The apparatus of claim 11 wherein the RF filter control module is configured to, in response to one of the MRF being greater than or equal to the minimum threshold MRF and the MRF being less than or equal to the maximum threshold MRF, maintain the RSS threshold.

13. The apparatus of claim 11 wherein the first processing module is configured to discard the received message in response to the RSS of the received message being less than the RSS threshold.

14. The apparatus of claim 11 wherein the first processing module is configured to perform a security verification on the received message in response to the RSS of the received message being greater than the RSS threshold.

* * * * *